April 5, 1966 E. W. CURTZE ETAL 3,244,337
APPARATUS AND METHOD FOR SCORING CONTINUOUSLY
MOVING GLASS SHEETS
Filed Dec. 30, 1964 3 Sheets-Sheet 1
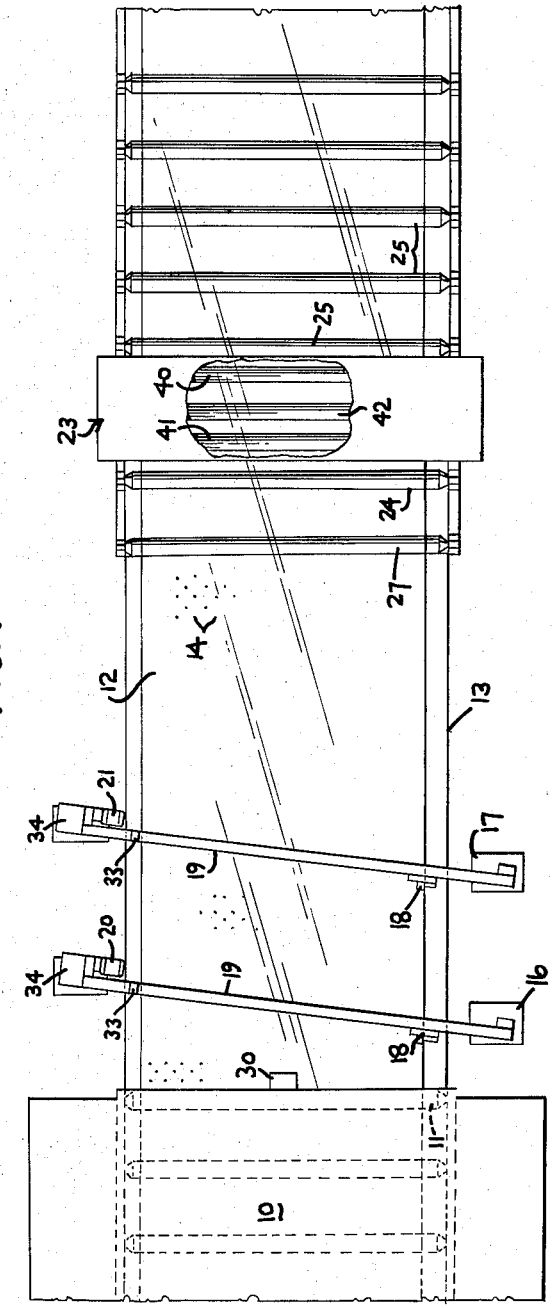
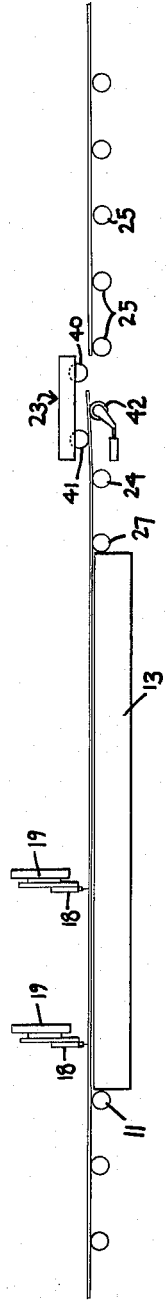
INVENTORS
EDWARD W. CURTZE
CLIFFORD A. MIKUS
CHARLES O. HUFFMAN
BY Chisholm and Spencer
ATTORNEYS April 5, 1966　　　　E. W. CURTZE ETAL　　　3,244,337
APPARATUS AND METHOD FOR SCORING CONTINUOUSLY
MOVING GLASS SHEETS
Filed Dec. 30, 1964　　　　　　　　　　　　3 Sheets-Sheet 2

INVENTOR
EDWARD W. CURTZE
CLIFFORD A. MIKUS
CHARLES O. HUFFMAN
BY
Chisholm and Spencer
ATTORNEY

United States Patent Office 3,244,337
Patented Apr. 5, 1966

3,244,337
APPARATUS AND METHOD FOR SCORING CONTINUOUSLY MOVING GLASS SHEETS
Edward W. Curtze, Wilkinsburg, and Clifford A. Mikus and Charles O. Huffman, Pittsburgh, Pa., assignors to Pittsburgh Plate Glass Company, Pittsburgh, Pa., a corporation of Pennsylvania
Filed Dec. 30, 1964, Ser. No. 422,307
8 Claims. (Cl. 225—2)

This invention relates to the construction and operation of apparatus for severing into segmented sheets, a continuously moving glass ribbon, and more particularly to a method and apparatus for severing a fluid supported glass ribbon.

To cut glass ribbons in prior art proposals, the moving ribbon was either brought to a halt, or a moving support was positioned beneath the ribbon and then clamped onto the sides of the glass sheet, and proceeded to move along with the sheet to provide support therefor, while a scoring device was run across the sheet. The stationary severing apparatus of the prior art because of the many manipulative steps required for cutting different size segments, has been a substantial limiting factor in the overall production of different size glass sheets. Difficulty has been encountered in moving the glass into position for scoring operation, and subsequently conveying the scored, cut glass sheet away.

A problem in scoring a moving ribbon of glass has been the support of the ribbon during scoring, i.e., when roller-type supports are used, there is an undulating surface developed due to the spaced between the rollers. Thus, as a moving scorer went across the ribbon of glass, the pressure upon the ribbon varied as the supporting surface underneath the glass varied, i.e., when the glass was over the crest of the roll a firm support was provided, and when the score was between the crest of the rolls, there was a tendency for the glass to deflect and thus not to have a uniform pressure on contact with the scoring device.

The invention herein disclosed includes supporting a glass ribbon on a fluid film, scoring the glass ribbon while supported on fluid and advancing the scored sheet to a severing apparatus, and then severing the ribbon into segmented sheets.

The embodiment fully described below illustrates cutting a moving ribbon of glass. However, it is contemplated that discrete sheets of glass may be cut using applicants' invention. Referring to the drawing (FIGS. 1 and 4) it is readily apparent that glass 22 may be sheets of glass.

A continuously moving ribbon of glass is supported on a fluid support table. A scoring device is positioned over the table and can be contacted to a major surface of the ribbon; a severing device is located downstream of the air table.

Pulse generating equipment is provided to synchronize the speed of a moving ribbon and the speed of the scoring device to produce a square cut. Electronic control translating means also actuates the severing device when a score is positioned on the severing device.

This invention provides apparatus and a method of scoring a continuously moving ribbon of glass. The invention provides great accuracy in cutting sheets to any desired size due to the elimination of the disadvantages of stationary and reciprocating supporting equipment and their associated inaccuracies in positioning the glass. Both scoring and later severing the glass ribbon can be done while the ribbon continues to move.

The use of fluid support such as an air support in conjunction with this cutting equipment has for the first time enabled the production of a continuous score across the sheet without the attendant problems of the prior art products. Thus, it has been possible to convert what was heretofore a "batch-type" operation to a continuous operation.

Referring now to the drawings:

FIG. 1 is a plan of the apparatus for severing glass sheets;

FIG. 4 is a side view, schematized, of the severing apparatus and associated conveyor system;

Figure 2:
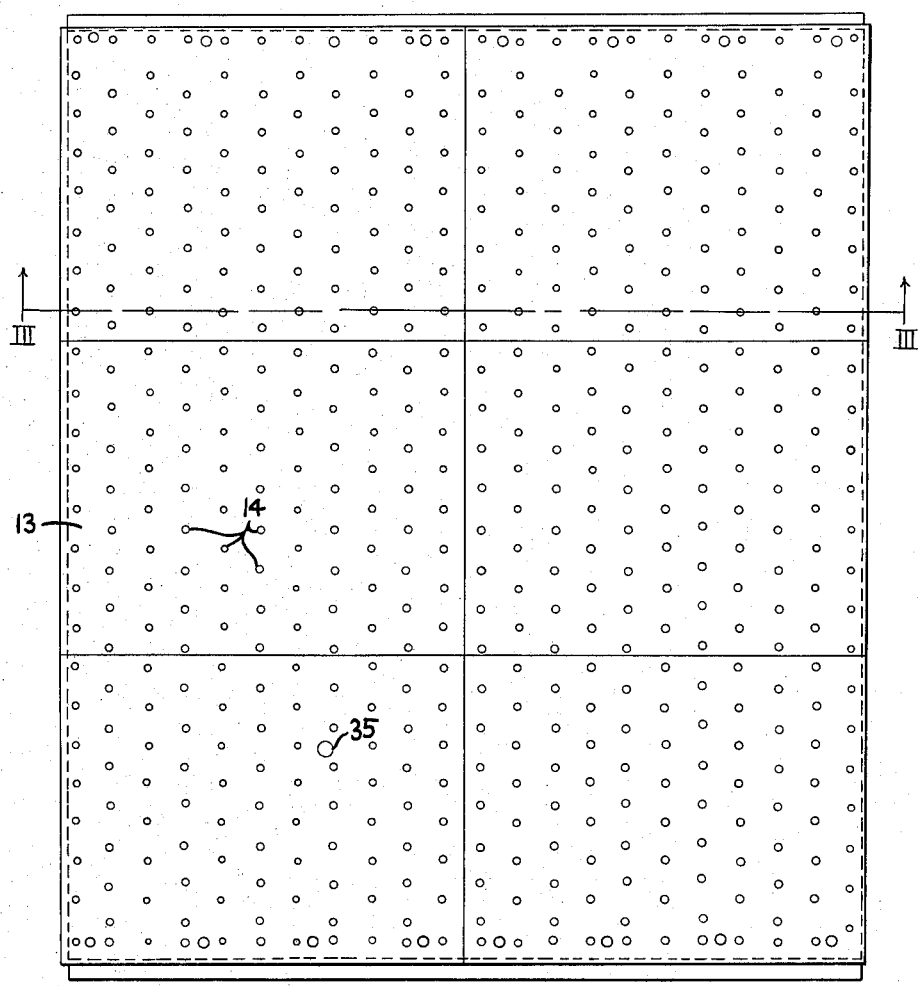
FIG. 2 is a plan view of the air support table in detail.
Figure 3:
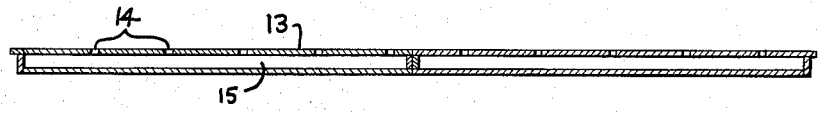
FIG. 3 is a section of the air table taken along lines III of FIG. 2.

Referring first to the general arrangement as illustrated in FIG. 1, shows a plan view of a conveyor section 10 and severing apparatus 23. Two angle bar cross scoring bridges 16 and 17 are positioned above an air support table 12. A severing device, in this embodiment is a power actuated high roll snapper 23, and is disposed downstream.

A detailed description of a preferred method of operation follows.

A ribbon of glass 22 from a suitable glass source is conveyed onto run-in conveyor 10 having representative conveyor rolls such as conveyor roll 11. The glass ribbon is run onto a major surface of fluid support, in this example the air support table 12 of FIG. 1. The air supply chamber or plenum is indicated at 15. Disposed across the top the air table are a pair of scoring bridges indicated at 19. Mounted on each scoring bridge is a scoring head 18. Mounted at an end of each scoring bridge is a synchronous motor 20 and 21. The scoring bridge is disposed over the air table at an angle from the perpendicular to a transverse line across the glass ribbon flow on the air table. The ribbon of glass is supported on the air support table by a film of air which is entrapped between the glass to be supported and the major surface of the air table.

A severing device 23 is situated downstream of the high roll snapper. A plurality of run out rolls such as that indicated at 27 make up the support surface of the run out table.

Referring to FIG. 2, the air support table has a multiplicity of ports 14 in a major surface, in a top section 13. The ports are spaced approximately 6 inches apart at their centers, and are about $\frac{1}{16}$ inch in diameter. Air under pressure of about 3 pounds per square inch is supplied from a plenum chamber 15. A film of air is formed above the top section 13 beneath the glass ribbon 22. The pressure is maintained sufficient to support and provide a solid backup while scoring.

The run-out conveyor 26 is sectionalized to accept both uncut ribbons of glass 26 at slow speeds while running out a cut size sheet at a high speed. Air table 12 provides a solid back up for the glass ribbon while the scoring device is moving across the moving ribbon.

A synchronous motor supplies the propulsion to the conveyor of the production line. These synchronous motors are driven from the same generating source as drives the synchronous motors of the scoring bridge. Therefore it is possible to provide a master control system which will synchronize the speed of the scoring head with the forward speed of the continuous ribbon of glass, which is also a final result of the forward speed of the entire conveyor line and also activate the snap severing device relative to a score on the glass. Either of the cross bridges may be used; however, one bridge is an emergency, or back-up bridge.

The pulse generator is required to measure and then score pieces of glass from the continuous ribbon in sizes that range from 30 inches to 180 inches in 1/32 inch intervals. Thus in operation the continuous glass ribbon is air supported on one major surface of table 12 and is in contact intermittently with the scoring device on an opposite major surface. To enable the scoring of transverse square sheets, the synchronous motors, the drive gearing of scores, and the angle of the bridge are chosen so that the scoring head travels across the bridge, the head itself makes a transverse score which is at 90 degrees to the running edge of the glass. The scoring head motor runs continuously at a speed proportional to the continuous ribbon of glass while the scoring head drive system is intermittently clutched to the drive motor to cause the scoring head to traverse in the desired score direction. The reverse clutch then being energized to return the scoring head to its base position.

The clutches are run at "over voltage" to insure a prompt acceleration of the scoring device to conveyor line speed.

The speed of the glass ribbon is measured electrically in one described embodiment by a pulse counting technique. An idler wheel riding on the glass drives an impulse generator through an accurate measuring wheel; as an appropriate length of glass passes beneath. The energization of the forward clutch immediately accelerates the scoring head to a scoring speed proportional to the glass velocity, drawing the scoring head across the glass. As the scoring head clutch is energized, a scoring head solenoid valve is energized. This solenoid valve will then supply a controlled pressure to the scoring heads which will contact the scoring head to the glass. The glass sheet is subject to flexing under the pressure of the scoring, and the air pressure supplied to the head maintains an approximately constant pressure on the glass, minimizing the effect of variations in the surface of the glass on the score pressure.

Figure 5:
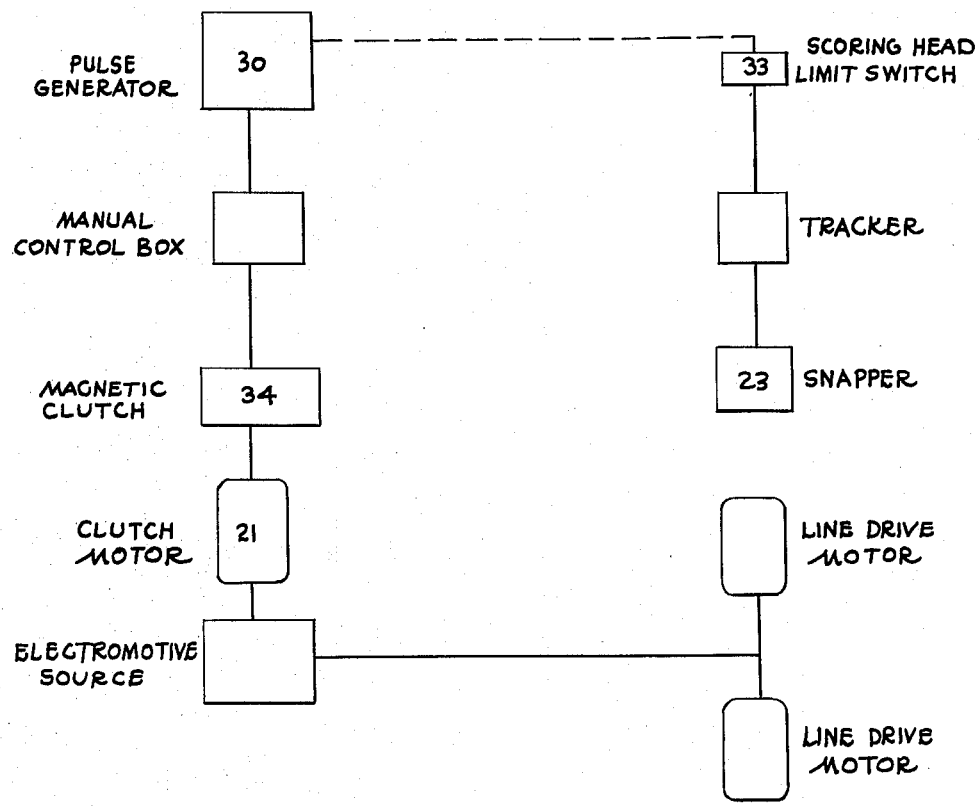
FIG. 5 is a block diagram illustrating the programming circuit means controlling the synchronization of the glass ribbon and the speed of the scoring device for the production of scores.

The sequence of operation of the scoring apparatus will now be described. Referring to FIG. 5, a pulse generator 30 pulses at a rate representative of a length of glass travelling beneath the scoring head 18. Pulses will be sent into a counter and manual control box. At an appropriate predetermined time an initiating pulse will be sent to the scoring bridge drive control and energize a scoring head forward drive clutch located in gear box 34. The energization of the clutch immediately accelerates the scoring head to a speed proportional to the moving glass ribbon speed and thus drawing the scoring head across the bridge 19. At the same time that the cutter head forward clutch is energized, a cutter head solenoid valve located on scoring head 18 is also energized. The solenoid valve applies a controlled air pressure to the scoring head which will lower the scoring head into the glass ribbon at a proper predetermined pressure and thus make the score in the ribbon as the head moves over the glass equalizing the effects of bending in the glass ribbon. When the scoring head completes its travel across the glass it will operate a suitable limiting switch 33 at the end of bridge 19. This switch in turn will actuate a circuit which will initiate the scoring head return to its home base. The return clutch is identical to the forward scoring clutch and is also located in gear box 34. A release of the air pressure supplied at the scoring head allows the scoring head to retract from the glass or its return to its home base position. The control system must also track the position of the score, after the score is made as glass travels down the conveyor until the score has reached approximately the center line of the snap roll 23. As a score is centered over the center line of the snap roll, the roll is actuated upwardly and causes the score to break, splitting a plate off the ribbon and thus produce a discontinuous sheet of glass. A run out conveyor is used to separate a cut sheet from the ribbon by accelerating the cut sheets from the production line and then speeding them toward a suitable warehouse or store room. The run out conveyor also continues to accept the unseparated ribbon of glass travelling at glass production line speed.

This invention provides both apparatus and a method of producing discontinuous sheets of glass cut to very accurate predetermined dimension. This combination of angled scoring device on an air support bed, and actuated high roll snapper and a multiple speed run out conveyor section provides an economically feasible method for the continuous production of accurately sized sheets of glass from a continuously moving ribbon and eliminates the inaccuracies caused by the use of ponderously heavy reciprocating equipment and also eliminates the necessity of having a trailing support bed beneath the glass.

We claim:
1. A method of cutting continuously moving ribbon of glass comprising supporting said glass ribbon on a film of air, scoring said moving glass ribbon while said ribbon is supported on said air film, severing said ribbon of glass along said score line to produce sheets of glass.

2. An apparatus for cutting a continuously moving ribbon of glass comprising; an air support table having a plurality of ports in a major surface thereof, means for supplying air through said ports to provide a film of air between said table major surface and said glass sheet positioned thereon so that the glass sheet is supported on a film of air, scoring means disposed over said air table and engageable with a major surface of said glass ribbon, severing means disposed downstream of said glass ribbbon for separating the ribbon along a score line, conveyor means disposed downstream of the severing means for transporting the cut segments away from the severing means.

3. A method of cutting a continuously moving ribbon of glass into segments of a pre-selected size comprising supporting a moving ribbon of glass on a film of air, scoring said ribbon while supported on said air film, advancing said scored glass sheet to a severing apparatus, and severing said glass sheet along said score to form discontinuous sheets of glass.

4. An apparatus for cutting a continuously moving ribbon of glass comprising; an air support table having a plurality of ports in a major surface thereof, means to supply air through said ports to provide a film of air between said table major surface and said glass ribbon positioned thereon so that the glass ribbon is supported on a film of air, scoring means disposed over said air table and engageable with a major surface of said glass ribbon, translating means connected to said moving ribbon of glass and to said scoring means for snychronizing the scoring speed with the speed of the moving ribbon of glass, severing means disposed downstream of said glass ribbon for separating the ribbon along a score line, translating means for synchronizing the speed of the moving ribbon of glass with the severing means so that the moving ribbon of glass is severed along said score line, conveyor means disposed downstream of the severing means for transporting the cut segment away from the severing means.

5. A method of cutting a continuously moving ribbon of glass into segments of a pre-selected size comprising; supporting a moving ribbon of glass on a film of air, scoring said ribbon while supported on said air film synchronizing the speed of the scoring operation with the forward speed of the moving ribbon of glass, advancing said scored glass sheet to a severing apparatus, and severing the said glass sheet along said score to form a discontinuous ribbon of glass.

6. A method of cutting a continuously moving ribbon of glass into segments of a pre-selected size comprising; supporting a moving ribbon of glass on a film of air, scoring said ribbon while supported on said air film, synchronizing the scoring speed to that of the speed of the moving ribbon of glass, severing said glass along said score to form a discontinuous ribbon of glass, and synchronizing the speed of the scored ribbon of glass so that the score is synchronized with the severing operation to form discontinuous ribbons of glass.

7. A method of cutting moving sheets of glass comprising: supporting said sheets on a film of air, scoring said moving glass sheet while said sheet is supported on said air film, severing said glass sheet along said score line.

8. An apparatus for cutting a continuously moving glass sheet comprising: an air support table having a plurality of ports in a major surface thereof, means for supplying air through said ports to provide a film of air between said table major surface and said glass sheet positioned thereon so that the glass sheet is supported on a film of air, scoring means disposed over said air table and engageable with a major surface of said glass sheet translating means connected to said moving sheet of glass and to said scoring means for synchronizing the scoring speed with the speed of the moving sheet of glass, severing means disposed downstream of said glass sheet for separating the sheet along a score line, translating means for synchronizing the speed of the moving sheet of glass with the severing means so that the moving glass of sheet is severed along said score line, conveyor means disposed downstream of the severing means for transporting the cut segment away from the severing means.

No references cited.

WILLIAM W. DYER, JR., *Primary Examiner.*

J. M. MEISTER, *Assistant Examiner.*